United States Patent
Suzuki et al.

(10) Patent No.: US 11,410,095 B2
(45) Date of Patent: Aug. 9, 2022

(54) SERVER, SYSTEM, AND INFORMATION PROCESSING METHOD FOR DECIDING A DISPATCH SCHEDULE OF A VEHICLE LOADED WITH EQUIPMENT TO BE USED IN A HEALTH CHECKUP

(71) Applicants: TOYOTA JIDOSHA KABUSHIKI KAISHA, Toyota (JP); DENSO CORPORATION, Kariya (JP)

(72) Inventors: Yukari Suzuki, Setagaya-ku (JP); Naoki Yamada, Toyota (JP); Toshihiro Arai, Nagoya (JP); Kuniaki Jinnai, Nagoya (JP); Keiichi Uno, Chita-gun (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/943,058

(22) Filed: Jul. 30, 2020

(65) Prior Publication Data
US 2021/0035038 A1 Feb. 4, 2021

(30) Foreign Application Priority Data
Jul. 30, 2019 (JP) .............................. JP2019-140170

(51) Int. Cl.
*G06Q 10/06* (2012.01)
*H04L 67/12* (2022.01)

(52) U.S. Cl.
CPC ........ *G06Q 10/06311* (2013.01); *H04L 67/12* (2013.01)

(58) Field of Classification Search
None
See application file for complete search history.

(56) References Cited

U.S. PATENT DOCUMENTS 11,030,560 B1 * 6/2021 Brandt .................. G08G 1/202
2008/0076971 A1 * 3/2008 Clapp .................. A61B 5/0002
600/300

FOREIGN PATENT DOCUMENTS

JP 2005-56132 A 3/2005
WO WO-2021247734 A1 * 12/2021

OTHER PUBLICATIONS

Cosmin Pascaru and Paul Diac, "Vehicle routing and scheduling for regular mobile healthcare services," 2018, International Conference on Tools with Artificial Intelligence, vol. 30, pp. 480-487 (Year: 2018).*

* cited by examiner

*Primary Examiner* — Amanda Gurski
(74) *Attorney, Agent, or Firm* — Oblon, McClelland, Maier & Neustadt, L.L.P.

(57) ABSTRACT

Provided is a system including a vehicle loaded with equipment to be used in a health checkup, a server configured to decide a dispatch schedule of the vehicle, and a terminal apparatus used by the user. The server sets the equipment to be loaded onto the vehicle based on information about the user transmitted from the terminal apparatus or information about the user stored in a database, and additionally decides the dispatch schedule for the vehicle. The terminal apparatus and the vehicle receives the dispatch schedule from the server, and the vehicle is driven based on the dispatch schedule.

15 Claims, 7 Drawing Sheets

SERVER, SYSTEM, AND INFORMATION PROCESSING METHOD FOR DECIDING A DISPATCH SCHEDULE OF A VEHICLE LOADED WITH EQUIPMENT TO BE USED IN A HEALTH CHECKUP

CROSS-REFERENCES TO RELATED APPLICATIONS

The present application claims the benefit of Japanese Patent Application No. 2019140170, filed in the Japan Patent Office on Jul. 30, 2019, which is incorporated by reference herein in its entirety.

TECHNICAL FIELD

The present disclosure relates to a server, a system, and an information processing method, and more particularly, to a server, a system, and an information processing method that dispatch a vehicle that provides a health checkup service.

BACKGROUND

Recently, various services have been implemented using a means of transportation such as an automobile. Such services may include, as one type of nursing service business, a shuttle service business (for example, a day care service) that provides, along with a nursing service at a business facility, a transportation business to transfer customers in cyclic order by a nursing vehicle capable of carrying such equipment as wheelchairs and stretchers.

Furthermore, PTL 1 proposes providing, to a round welcoming and sending service enterprise using a nursing vehicle, a service of generating a dispatch/going-around plan by referencing nursing vehicle specifications and customer information, and also proposes providing, to a vehicle company, a nursing vehicle consulting for proposing a vehicle according to the characteristics of a round welcoming and sending service enterprise as a customer or providing marketing data on vehicle development.

CITATION LIST

Patent Literature

PTL 1: JP200556132A

SUMMARY

A variety of services have been provided to directly or indirectly support people in need of nursing care; however, more services are still needed for providing, in the aim of reducing the medical expenses for a society as a whole, health maintenance and management for apparently healthy people.

For example, "health checkups" are indispensable for the prevention and early detection of diseases. In general, every company arranges health checkups for their employees every year, and thus employees working for such company would find it rather easy to undergo health checkups. In contrast, people who do not work for a company or are dependent family members would undergo what is called a "family health checkup" or a health checkup administered by a local government. Those who want to receive such health checkups need to visit a hospital or a facility designated by the company or the local government.

However, people would generally find it inconvenient to visit a distant hospital or facility merely for a health checkup, and people who do not work for companies would often procrastinate undergoing any health checkup for a long time.

Consequently, it would be helpful to provide a server, a system, and an information processing method capable of providing a more convenient health checkup service to checkup examinees.

A server according to an embodiment of the present disclosure decides a dispatch schedule of a vehicle loaded with equipment to be used in a health checkup, and includes a communication interface configured to acquire information about a user to undergo the health checkup, and a controller configured to determine the equipment to be loaded onto the vehicle based on the information about the user, and additionally decide the dispatch schedule of the vehicle.

A system according to an embodiment of the present disclosure includes the server, a terminal apparatus used by a user, and a vehicle loaded with equipment to be used in a health checkup. The terminal apparatus and the vehicle receive the dispatch schedule from the server, and the vehicle is driven based on the dispatch schedule.

Also, an information processing method according to an embodiment of the present disclosure is for deciding a dispatch schedule for a vehicle loaded with equipment to be used in a health checkup, the method including: acquiring information about a user to undergo the health checkup; selecting the equipment to be used based on the information about the user, and determining the equipment to be loaded onto the vehicle; and deciding the dispatch schedule of the vehicle based on the information about the user.

The server, the system, and the information processing method in the present disclosure allow for providing a more convenient health checkup service to checkup examinees.

DETAILED DESCRIPTION

Figure 1:
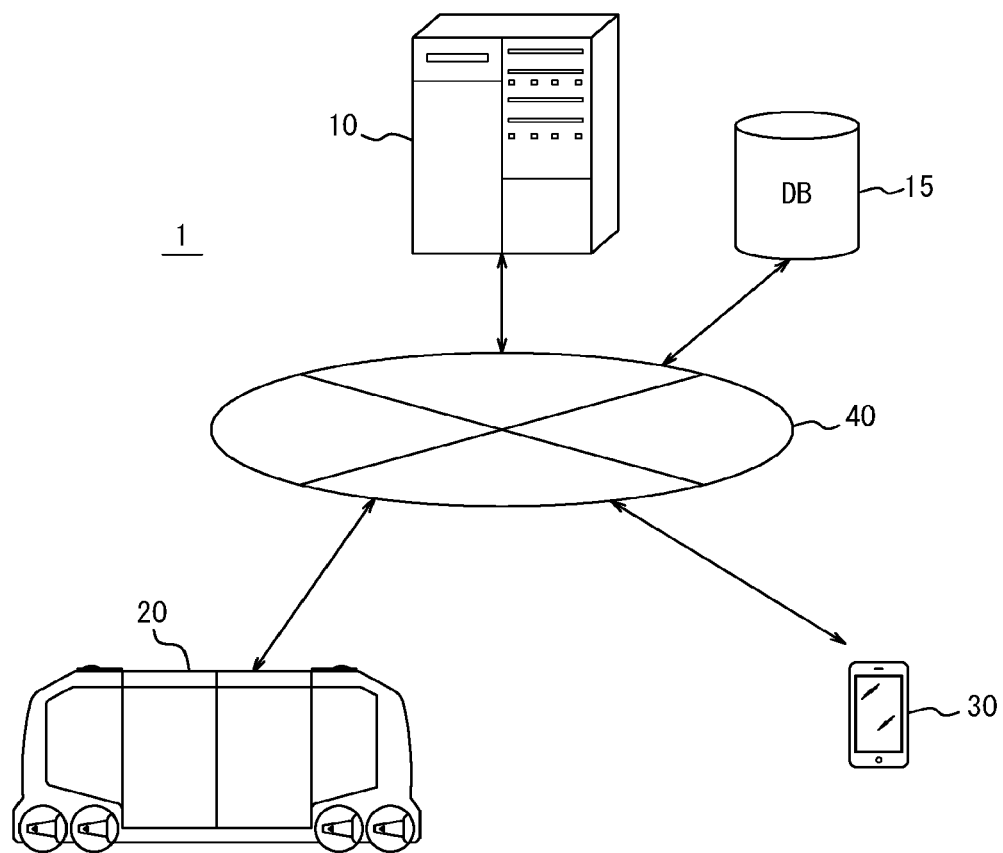
FIG. 1 is a diagram illustrating an exemplary configuration of a system according to an embodiment.

Hereinafter, an embodiment for carrying out the present disclosure will be described with reference to the drawings. In the drawings, identical or similar components are denoted with the same signs.

FIG. 1 is a diagram illustrating an exemplary configuration of a system for providing a health checkup service according to an embodiment of the present disclosure. A system 1 according to the present embodiment includes a server 10, a vehicle 20, and a terminal apparatus 30. The server 10, the vehicle 20 and the terminal apparatus 30 are connected by a network 40 of any type that allows for information communication. Additionally, in the system 1, a database (DB) 15 is connected to the network 40 as necessary. One vehicle 20 and one terminal apparatus 30 are illustrated in FIG. 1; however, a plurality of each may also be connected to the network 40.

To give an overview of the present disclosure, the vehicle 20 is loaded with equipment to be used in a health checkup, based on information about a user who is to undergo the health checkup. The "equipment" refers to equipment or devices to be used in a health checkup, such as a blood pressure gauge, blood testing equipment, an electrocardiograph machine, X-ray diagnostic imaging equipment, an ultrasonographic device, a computed tomography (CT) device, a magnetic resonance imaging (MRI) device, and accessory equipment, for example. The accessory equipment includes a bed for a checkup examinee to lie on during an examination and a chair, for example. The server 10 decides a dispatch schedule of the vehicle 20, and the vehicle 20 is operated to go around a region where the user who is to undergo a health checkup lives based on the dispatch schedule.

The server 10 acquires information about the user, from at least one of the database 15 and the terminal apparatus 30 used by the user. Herein, the user refers to a subject who is to receive a health checkup, including a person who should undergo a health checkup (a person who has not undergone a health checkup that should be performed) or a person who voluntarily wants to receive a health checkup. Also, the information about the user includes personal information such as the user's name, date of birth, and address (position information), as well as inspection items that should be checked or inspection items that the user wants to have checked in the user's health checkup. Furthermore, the information about the user may also include a desired consultation date and time for checkup specified by the user.

Also, the server 10 selects the equipment to be used in the health checkup based on the information about the user, and determines the equipment to load onto the vehicle 20. Furthermore, the server 10 decides a dispatch schedule for the vehicle 20 based on the information about the user. The configuration and operation of the server 10 will be described in detail later.

The database 15 stores information related to users who are to undergo a health checkup. The database 15 may be of a government agency and store information such as the names, addresses, and health checkup histories of residents, or of health checkup histories of the employees of a company subscribing to the system 1 and the employees' families.

The vehicle 20 is loaded with equipment to be used in the health checkup, and is operated to go around a region where the user who is to receive the health checkup lives based on the dispatch schedule set by the server 10. The vehicle 20 may be a special-purpose vehicle provided with equipment to be used for inspection items in a predetermined health checkup, or a general-purpose vehicle that can be provided with equipment to be used for inspection items of any type. A plurality of vehicles 20 may also exist, and it is desirable to adjust factors such as the types of equipment provided in each vehicle 20 and the number of vehicles 20 according to the inspection items and the like to be checked in the user requiring the health checkup. Specifically, the vehicle 20 is loaded with equipment to be used in a health checkup based on the equipment to be loaded onto the vehicle 20 that is set by the server 10 (when there is a plurality of vehicles 20, the combination of a vehicle 20 and the equipment). Thereafter, the vehicle 20 is operated based on the dispatch schedule. As described later, the vehicle 20 may also perform autonomous driving or follow-up driving.

The terminal apparatus 30 is a communication apparatus to be used by the user who is to undergo the health checkup, and may be a device such as a mobile phone, a smartphone, a smart speaker, or a personal computer (PC). However, the terminal apparatus 30 is not limited to the above, and may be any type of apparatus to be used by the user.

The terminal apparatus 30 transmits the information about the user related to a health checkup to the server 10. For example, the terminal apparatus 30 can use an application to transmit basic information such as the user's name and address as well as information such as the desired inspection items to be checked and a desired consultation date and time for checkup. The terminal apparatus 30 may also receive information from the server 10. The information received from the server 10 may indicate, for example, the dispatch schedule, a scheduled time and place of the checkup for each user, and a push notification when the vehicle 20 has approached. The information indicating the dispatch schedule specifically indicates the schedule for dispatching the vehicle 20 loaded with equipment, and also indicates locations to visit and times, a driving route, parking locations, and parking times.

The network 40 is a communication network of any type allowing the server 10, the vehicle 20, and the terminal apparatus 30 to communicate with one another. The network 40 may be a wireless or wired transmission channel, and may be a communication network such as the Internet. For example, the network 40 in the present embodiment may include an ad hoc network, a metropolitan area network (MAN), a cellular network, a wireless personal area network (WPAN), the public switched telephone network (PSTN), a terrestrial wireless network, an optical network, some other network, or a combination of any of the above. A wireless network includes components such as an access point (for example, a Wi-Fi access point) and femtocells. Additionally, wireless communication equipment can be connected to a wireless network using Wi-Fi® (Wi-Fi is a registered trademark in Japan, other countries, or both), Bluetooth® (Bluetooth is a registered trademark in Japan, other countries, or both), cellular communication technology, or some other wireless technology and technology standard.

According to the system 1, the vehicle 20 loaded with equipment to be used in the health checkup is operated to go around a region where the user who is to undergo the health checkup lives, and act as a mobile health checkup facility, thereby enabling the user to conveniently undergo the health checkup. Consequently, the percentage of people who undergo health checkups is raised. In the embodiment above, the database 15 is described as being connected to the network 40 of the system 1, but in cases where the information stored in the database 15 is not used, the database 15 may be omitted.

Next, the configuration and operation (information processing method) of the server 10 will be described in detail.

(Server Configuration)

Figure 2:
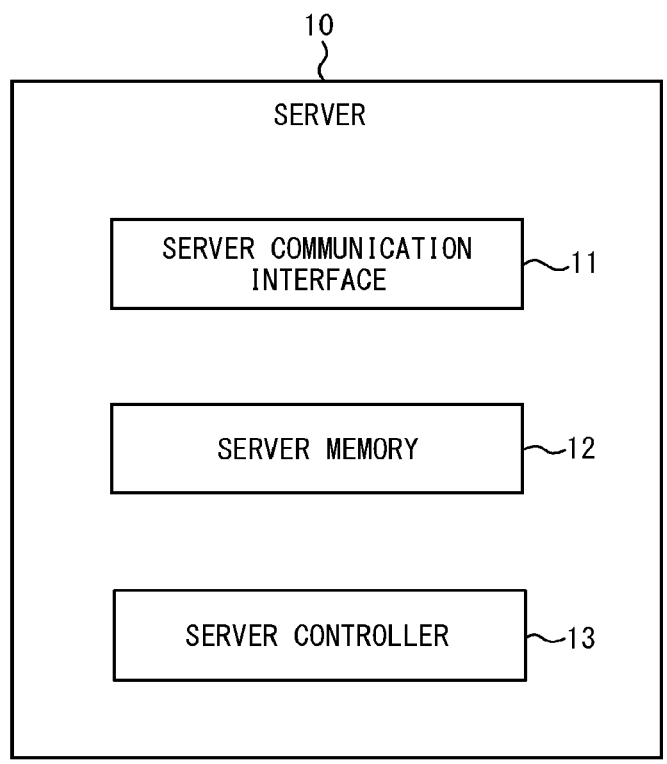
FIG. 2 is a diagram illustrating an exemplary configuration of a server according to an embodiment.

FIG. 2 is a diagram illustrating an exemplary configuration of the server 10 according to an embodiment. The server 10 includes a server communication interface 11, server memory 12, and a server controller 13.

The server communication interface (also simply referred to as the communication interface) 11 includes a communication module that connects to the network 40. The communication module supports mobile communication standards such as 4th Generation (4G) and 5th Generation (5G), a wired local area network (LAN) standard, or a wireless LAN standard for example, but is not limited to the above, and may support any type of communication standard. In the present embodiment, the server 10 is connected to the network 40 through the server communication interface 11. The server communication interface 11 receives (acquires) information about the user transmitted from the database 15 or the terminal apparatus 30 of the user over the network 40. The server communication interface 11 is also capable of transmitting information (for example, the dispatch schedule) to the vehicle 20 or the terminal apparatus 30 of the user over the network 40.

The server memory 12 (also simply referred to as the memory) 12 includes a semiconductor memory or a magnetic memory. The server memory 12 may function as a main memory, an auxiliary memory, or a cache memory, for example. The server memory 12 stores information of any type used in the operation of the server 10. For example, the server memory 12 stores information such as a system program, an application program, and a management database. It may also be possible to update the information stored in the server memory 12 with information acquired from the network 40 through the server communication interface 11 for example.

In the present embodiment, the server memory 12 stores information about the user acquired from at least one of the database 15 and the terminal apparatus 30 used by the user. Also, the server memory 12 stores correspondence relationships between inspection items of a health checkup and the equipment used to check such inspection items. Furthermore, the server memory 12 may also store the operating status of the vehicle 20. The operating status of the vehicle 20 includes the specifications of the vehicle 20 currently in operation and information regarding the equipment loaded onto the vehicle 20, for example.

The server controller (also simply referred to as the controller) 13 includes one or more processors. In the present embodiment, "processor" refers to, but is not limited to, a general-purpose processor or a special-purpose processor specialized for a specific process. The server controller 13 controls the operation of the server 10 as a whole. For example, the server controller 13 controls the server 10 based on programs such as the system program and the application program stored in the server memory 12.

In the present embodiment, the server controller 13 references the correspondence relationships between the inspection items included in the information about the user and the equipment used to check the inspection items stored in the server memory 12, and selects the equipment required for the examination based on the anticipated inspection items during the next operation (going-around) of the vehicle 20. Also, the server controller 13 determines the equipment to be loaded onto the vehicle 20 (in the case where there is a plurality of vehicles, the combinations of a vehicle 20 and the equipment) based on the equipment to be used for examination and the status of the vehicle 20 (such as the specifications of the vehicle 20 not yet loaded with equipment or a vehicle 20 already loaded with equipment and the types of equipment, for example). Information about the equipment to load onto the vehicle 20 is provided to the vehicle 20.

Next, the server controller 13 decides a dispatch schedule for the vehicle 20 loaded with the equipment to be used in the health checkup based on the information about the user to undergo the health checkup, such that user convenience is increased. The decided dispatch schedule is transmitted to the vehicle 20 and the terminal apparatus 30 through the server communication interface 11.

Also, the server controller 13 is capable of receiving driving information about the vehicle 20 (such as position information and the traveling speed of the vehicle 20) from the vehicle 20 through the server communication interface 11. The server controller 13 stores the driving information in the server memory 12, and may correct the dispatch schedule of the vehicle 20 as necessary based on the stored information. The server controller 13 may also transmit update information for updating the dispatch schedule of the vehicle 20, the system program, the application program, or the like to the vehicle 20 through the server communication interface 11.

(Information Processing Method by Server)

Figure 3:
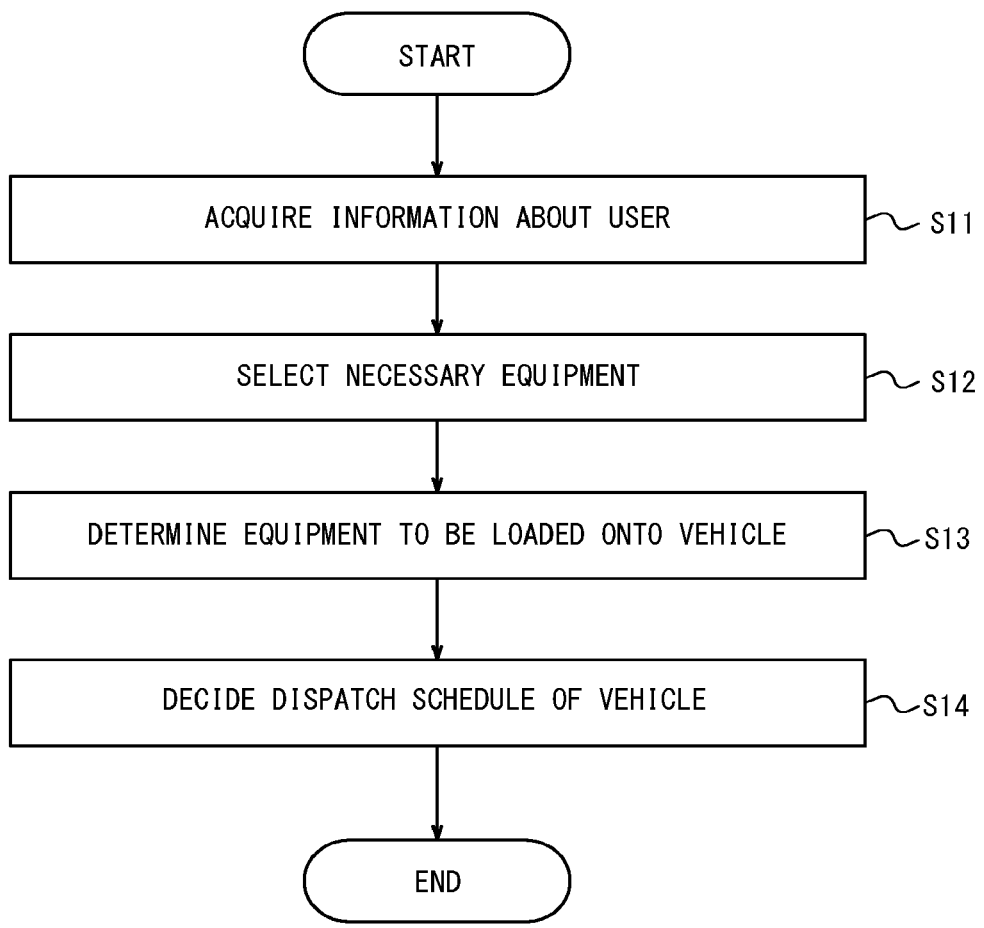
FIG. 3 is a flowchart illustrating an example of an information processing method by the server.

An example of an information processing method by the server 10 will be described using the flowchart illustrated in FIG. 3. The server 10 executes the following steps S11 to S14 to decide a dispatch schedule for the vehicle 20 loaded with the equipment to be used in a health checkup, and transmit the dispatch schedule to the vehicle 20 and the terminal apparatus 30.

Step S11: The server 10 acquires information about the user treated as the target person to undergo a health checkup from at least one of the database 15 and the terminal apparatus 30 of the user.

For example, the server 10 can connect to the database 15 storing information about the user over the network 40, and extract information about a user who should undergo a health checkup (such as a person who has not undergone a health checkup in a predetermined period) from the database 15. The server 10 can also receive information about a user who wants to undergo a health checkup, from the terminal apparatus 30 used by the user. The information about the user includes at least one of inspection items for the user (inspection items to be checked for each user), position information of the user (the user's address or current position information), and a desired consultation date and time for checkup specified by the user. The server 10 stores the acquired information about the user, in the server memory 12. Particularly, the server 10 may register a user who has transmitted information from the terminal apparatus 30 as a health checkup user of the system 1.

Step S12: The server 10 selects the equipment necessary for a health checkup, based on the acquired information about the user. In other words, the server 10 references the correspondence relationships between the inspection items of the health checkup and the equipment to be used for the inspection items, and selects the equipment to be used for examination in correspondence with the inspection items of the health checkup that the user is to undergo and optional inspection items desired by the user.

Typical inspection items of a health checkup generally include the following items.

1. Medical history and work history
2. Presence or absence of subjective symptoms and objective symptoms
3. Examination of height, weight, abdominal circumference, vision, and hearing
4. Chest X-ray
5. Blood pressure measurement
6. Anemia examination (hemoglobin content and red blood cell count)
7. Liver function test (GOT, GPT, γ-GTP)
8. Blood lipid test (LDL cholesterol, HDL cholesterol, serum triglycerides)
9. Blood sugar test 10. Urinalysis (presence or absence of sugar and protein in the urine)

11. Electrocardiogram

For example, for a checkup examinee extracted as not having undergone any health checkup over a predetermined period, the above typical inspection items of a health checkup are set automatically as the inspection items to be checked.

In addition, various other tests, such as an ultrasound of the abdomen or the carotid artery, a CT scan, a head MRI, a mammogram, and an osteoporosis test may be included as optional inspection items. The server 10 selects the corresponding equipment to enable the optional inspection items desired by the user to be performed in addition to the typical inspection items.

Step S13: The server 10 determines the equipment to be loaded onto the vehicle 20. Specifically, factors such as the types of inspection items, the number of users scheduled for consultation for checkup, and the time available for consultation for checkup are considered to calculate the types and required number of each piece equipment to be used for the examination. Next, the server 10 determines the type of the vehicle 20 and the equipment to be loaded onto the vehicle 20 to optimize the amount of equipment loaded onto the vehicle 20.

Operation may be simpler if all of the equipment to be used in a health checkup is always loaded onto a predetermined vehicle 20, but the amount of equipment to be used varies depending on the inspection items. Consequently, the type of vehicle, such as a large-sized vehicle, a medium-sized vehicle, or a small-sized vehicle, may be selected and combined with the equipment to be used according to the inspection items.

Furthermore, in some cases, a large variety of equipment is necessary for a health checkup, and the equipment to be used for examination may be distributed and loaded onto a plurality of vehicles 20.

After selecting the equipment to be used in a health checkup, the server 10 computes the required total installation area from the installation area and number of each piece of equipment, and additionally computes the required number of vehicles 20 from the required total installation area. The vehicles 20 are all not necessarily in the same size, and an appropriate combination of large-sized vehicles, medium-sized vehicles, and small-sized vehicles may be prepared.

Figure 4:
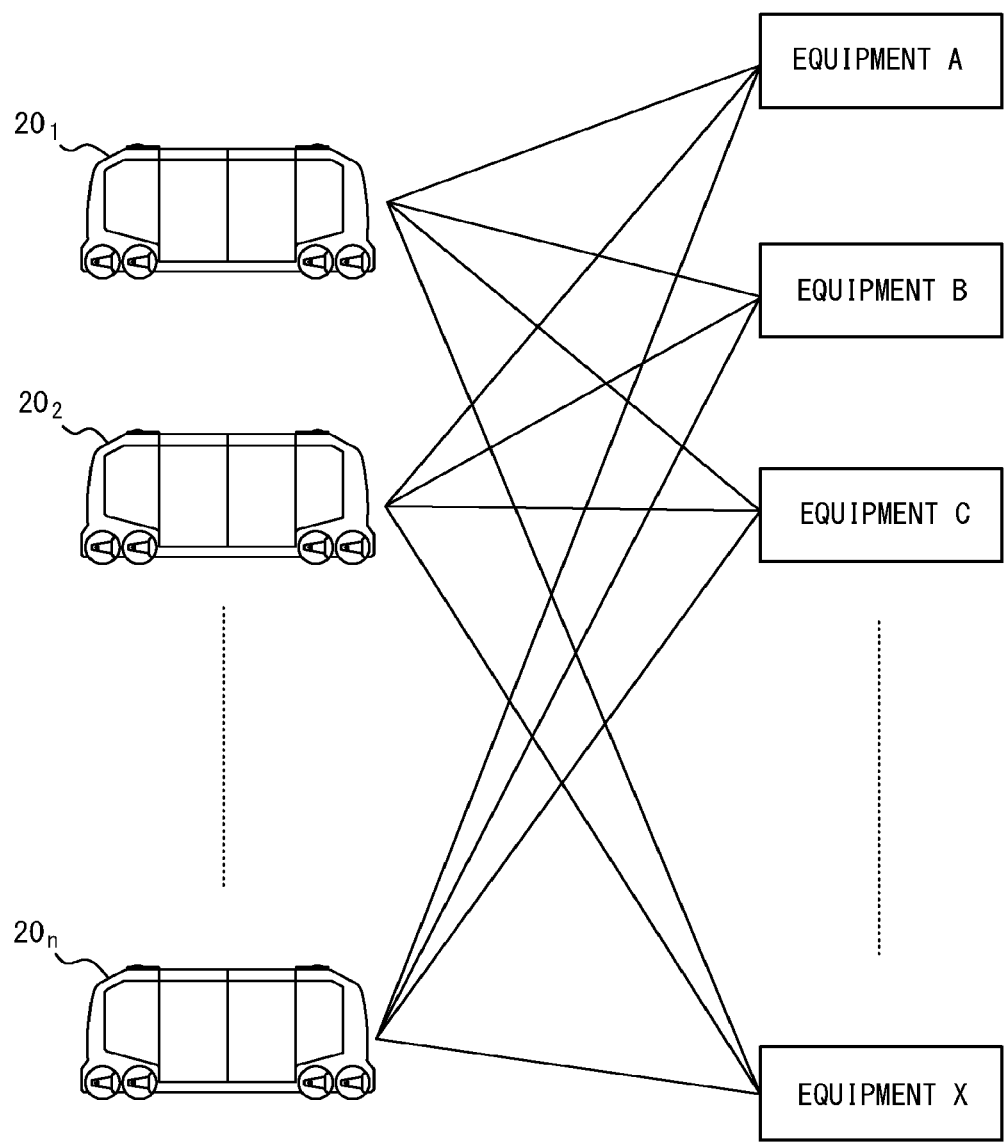
FIG. 4 is a conceptual diagram regarding combinations of equipment to be used in a health checkup and vehicles.

FIG. 4 is a conceptual diagram regarding combinations of equipment to be used in a health checkup and a plurality of vehicles 20. The server 10 combines the prepared vehicles 20 ($20_1$ to $20_n$) with the equipment (A to X) to be used for examination, and determines the equipment to be loaded onto each vehicle 20. There are various methods of setting combinations; for example, the vehicles 20 and the equipment are combined to maximize the installation density of the equipment. Although combining equipment with unloaded vehicles 20 is described herein, in the case where vehicles 20 already loaded with equipment exist (for example, in the case where the vehicle $20_1$ is loaded with the equipment A to C, the vehicle $20_2$ is loaded with the equipment D to F, the vehicle $20_3$ is loaded with the equipment G, and so on), the equipment to be loaded onto the vehicles 20 may be determined by combining the vehicles 20 already loaded with equipment.

A physician may also ride in the vehicle 20. Equipment for performing a remote diagnosis, such as a terminal apparatus that remotely communicates with a physician, may also be loaded onto the vehicle 20.

Information about the equipment to be loaded onto the vehicle 20 (information about a combination of a vehicle 20 and equipment) is transmitted to the vehicle 20. Thereafter, based on the information about the equipment to be loaded onto the vehicle 20, the examination equipment is actually loaded onto the vehicle 20, and the vehicle 20 for providing the health checkup service is configured. The work of loading the vehicle 20 may be performed according to any of various methods. For example, the vehicle 20 may collect the equipment based on the information about the equipment to be loaded, and may automatically load the equipment. Alternatively, the vehicle 20 may transmit necessary information to an administration department or the like, and at least a part of the loading work may be performed manually.

Step S14: Returning to FIG. 3, the server 10 decides a dispatch schedule of the vehicle 20 based on the information about the user. Specifically, the server 10 decides a dispatch schedule for the vehicle 20 loaded with the equipment to be used in a health checkup based on at least one of the position of the user (for example, information about the address, or position information of the terminal apparatus 30) and the user's desired consultation date and time for checkup input from the terminal apparatus 30, such that user convenience is improved.

For example, the server 10 extracts position information of the user to undergo the health checkup (for example, the user's address or position information of the terminal apparatus 30) from the information about the user, and for a region in which the number of users is greater than a predetermined value, the server 10 decides a dispatch schedule including information indicating, for example, a driving route, parking locations, and parking times of the vehicle 20, making it possible to perform health checkups at a central position for the users in the region (an average value of the position information of the plurality of users). Also, in a region in which the number of users specifying a desired consultation date and time for checkup is greater than a predetermined number, the server controller 13 may decide a dispatch schedule so that the vehicle 20 is operated in a period of time close to the average value of the desired consultation dates and times for checkup specified by the users.

Thereafter, the server 10 transmits the decided dispatch schedule to the vehicle 20 and the terminal apparatus 30. The server 10 may also specify a consultation date and time for checkup for each user (checkup examinee), and transmit the consultation date and time for checkup specified for each user to the terminal apparatus 30. It is desirable for the dispatch schedule to not only be transmitted to the terminal apparatus 30, but also be widely publicized to residents in the operating area by using a means of disseminating information by a government agency, for example. By widely publicizing the dispatch schedule of the health checkup service, it is anticipated that a higher percentage of people who have not undergone a health checkup so far will choose to undergo a health checkup.

(Vehicle Configuration)

Figure 5:
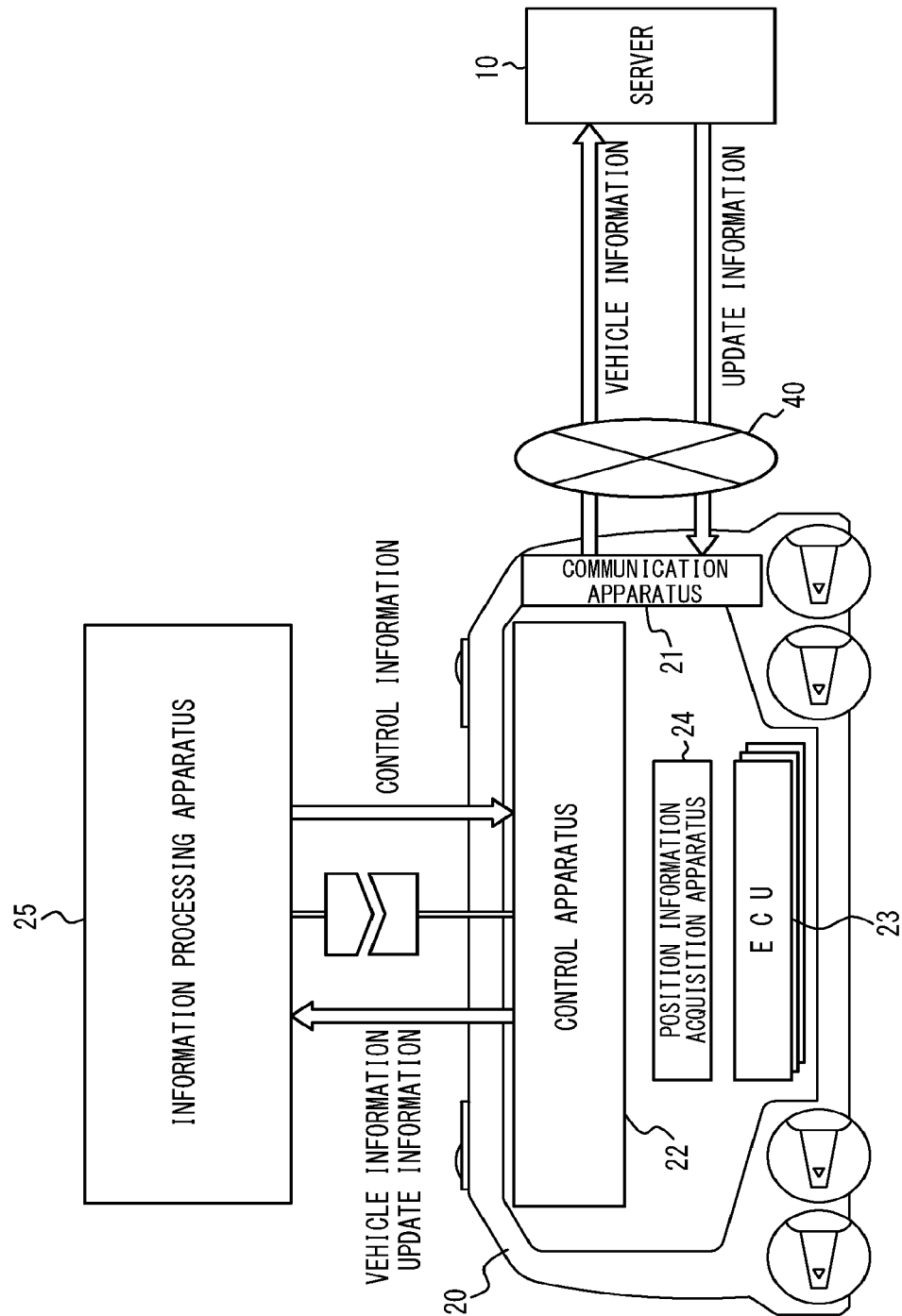
FIG. 5 is a diagram illustrating an exemplary configuration of a vehicle according to an embodiment.

FIG. 5 is a diagram for explaining an exemplary configuration of the vehicle 20 according to an embodiment. The vehicle 20 includes an information processing apparatus 25 that controls the vehicle 20 as auxiliary equipment. The vehicle 20, the information processing apparatus 25, and the server 10 are connected by the network 40 such as the Internet, for example.

The vehicle 20 is an automobile capable of autonomous driving or follow-up driving, for example, but is not limited thereto, and may be a vehicle of any type onto which equipment can be loaded.

Control of the vehicle 20 is executed through cooperation by the vehicle 20 and the information processing apparatus 25. To summarize, the information processing apparatus 25 automatically generates control information according to autonomous driving control software, and transmits the generated control information to the vehicle 20. The vehicle 20 is controlled based on the received control information. The vehicle control is autonomous drive control for example, but is not limited thereto. At least a part of an application programming interface (API) stipulating the specifications of the control information is disclosed to a service provider. The service provider is capable of using the disclosed API to freely program the autonomous driving control software of the information processing apparatus 25. Consequently, by loading equipment according to the purpose into the interior space of the vehicle 20 and programming the autonomous driving control software using the API according to the purpose, the service provider is capable of providing a mobility service of any type.

In the present embodiment, the equipment to be used in a health checkup is loaded onto such a vehicle 20, and the vehicle 20 may be driven to a destination by autonomous driving based on a dispatch schedule transmitted from the server 10.

The vehicle 20 includes a communication apparatus 21, a control apparatus 22, a plurality of electronic control units (ECUs) 23, and a position information acquisition apparatus 24. The apparatuses 21 to 24 are communicably connected via an on-board network such as a controller area network (CAN) or dedicated lines, for example.

The communication apparatus 21 may be an on-board communication module such as a data communication module (DCM), for example. The communication apparatus 21 may also include a communication module supporting mobile communications standard such as 4th Generation (4G) and 5th Generation (5G) to connect to the network 40.

The control apparatus 22 is an apparatus that controls the vehicle based on the control information from the information processing apparatus 25. The vehicle control is autonomous driving control to a destination for example, but is not limited thereto. Autonomous driving includes Levels 1 to 5 of driving automation defined by the Society of Automotive Engineers (SAE) for example, but is not limited thereto, and may be defined in any way. Also, vehicle control is performed through cooperation by components such as the control apparatus 22 and each ECU 23. The control apparatus 22 includes a communication module configured to communicate with the information processing apparatus 25, the communication apparatus 21, and each ECU 23, one or more memories that store information such as a system program and an application program, and a controller including one or more processors that control the operation of the control apparatus 22 as a whole.

For example, the control apparatus 22 receives various kinds of vehicle information related to the vehicle 20 (such as speed, position, and autonomous driving status) from each of the ECUs 23. The control apparatus 22 transmits the vehicle information to the information processing apparatus 25, and also transmits the vehicle information to the server 10 through the communication apparatus 21. In addition, the control apparatus 22 receives update information for the system program and the like of the information processing apparatus 25 from the server 10 through the communication apparatus 21, and transmits the update information to the information processing apparatus 25. Also, in the case of acquiring control information from the information processing apparatus 25, the control apparatus 22 controls the vehicle 20 based on the control information.

The plurality of ECUs 23 cooperate with the control apparatus 22 to control the operation of the vehicle 20. Specifically, the plurality of ECUs 23 receive control instructions based on the control information from the control apparatus 22, and control the operation of the vehicle 20 in accordance with the control instructions. For example, the plurality of ECUs 23 cause operation quantities of the vehicle 20 to become the values indicated by the control instructions. Additionally, at each control timing, the plurality of ECUs 23 collect measured values of control quantities or operation quantities of the vehicle 20 from various sensors installed in the vehicle 20, and transmit the measured values to the control apparatus 22.

The position information acquisition apparatus 24 includes one or more receivers that support a satellite positioning system of any type. For example, the position information acquisition apparatus 24 may include a Global Positioning System (GPS) receiver. The position information acquisition apparatus 24 acquires a measured value of the position of the vehicle 20 as position information, and transmits the position information to the control apparatus 22.

The information processing apparatus 25 includes a communication module configured to connect to the control apparatus 22 of the vehicle 20, one or more memories configured to store information such as a system program and an application program, one or more sensors that detect information related to the operation of the information processing apparatus 25 or the surrounding environment, and a controller including one or more processors configured to control the operation of the information processing apparatus 25 as a whole. The information processing apparatus 25 is installed in a position such as on the rooftop of the vehicle 20, for example. The information processing apparatus 25 may also be installed at any position of the exterior or interior of the vehicle 20, without being limited to the aforementioned position.

The information processing apparatus 25 receives vehicle information and update information from the control apparatus 22. The information processing apparatus 25 also generates control information based on information such as sensor information and vehicle information, and transmits the control information to the control apparatus 22. Additionally, the application program stored in the memory may include autonomous driving control software, and in this case, the information processing apparatus 25 functions as an autonomous driving kit according to the autonomous driving control software.

With this arrangement, the vehicle 20 is capable of performing autonomous driving or follow-up driving.

(Operation of Terminal Apparatus)

The terminal apparatus 30 may be configured in any way insofar as the terminal apparatus 30 has functions such as a function of communicating over the network 40, a function of receiving input from the user, and a function of displaying various information.

Figure 6:
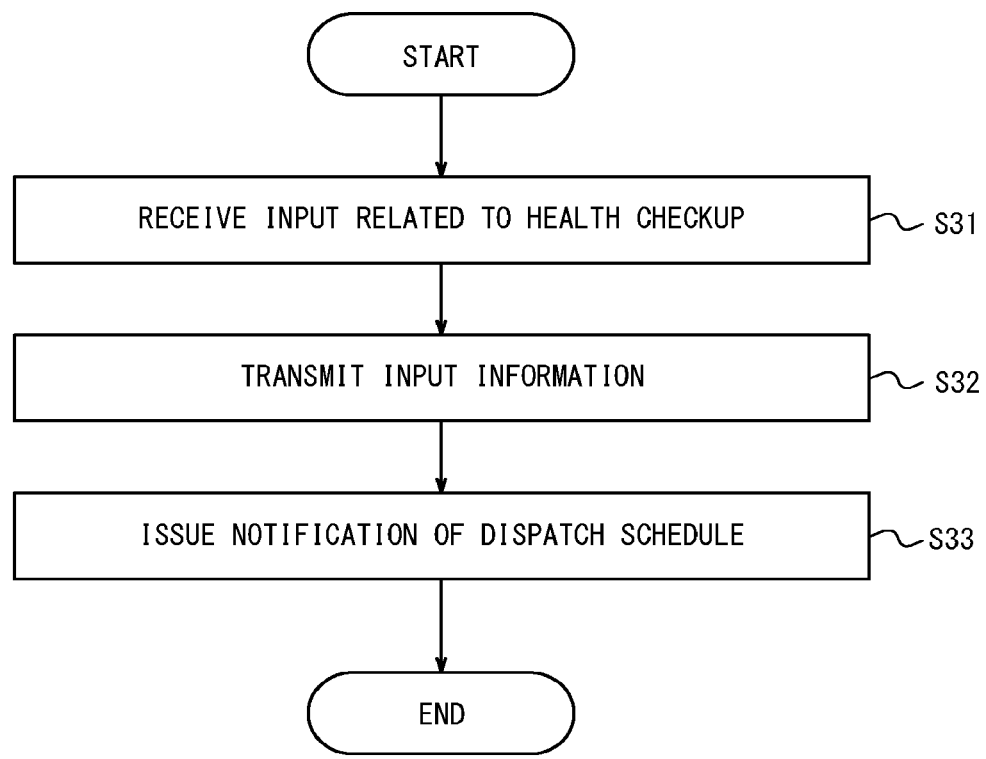
FIG. 6 is a flowchart illustrating an example of the operation of a terminal apparatus.

FIG. 6 is a flowchart illustrating an example of the operation of the terminal apparatus 30.

Step S31: The terminal apparatus 30 receives input related to a health checkup from the user. The input related to a health checkup from the user is made possible by starting an application for requesting a health checkup installed in the terminal apparatus 30, for example. The application is downloaded from the server 10 in advance. When the application is started, the terminal apparatus 30 transmits a request to display a health checkup request screen to the server 10. Subsequently, the terminal apparatus 30 displays the request screen transmitted from the server 10 in response to the transmission of the display request. Through input by the user on the request screen, the terminal apparatus 30 can receive the input related to a health checkup desired by the user.

Step S32: When the input related to a health checkup desired by the user is received, the terminal apparatus 30 transmits the input information to the server 10 over the network 40. The input information to transmit may include basic information such as the user's name and address, as well as information such as desired inspection items to check (optional inspection items) and a desired consultation date and time for checkup. Note that although it is possible to individually input the desired inspection items to check, a setting may be provided such that if "General health checkup" is selected on the input screen, a list of standard inspection items is selected automatically and transmitted. Also, because the terminal apparatus 30 is capable of acquiring position information based on a Global Positioning System (GPS) signal, for example, the input information to transmit may include current position information of the terminal apparatus 30 of the user may be included instead of the user's address.

Step S33: After that, when notified by the server 10 of a dispatch schedule for the vehicle 20 loaded with the equipment to be used in a health checkup, the terminal apparatus 30 notifies the user by displaying the dispatch schedule and the like. Also, in the case where information such as a scheduled time or place of the checkup for each user is transmitted from the server 10, the terminal apparatus 30 notifies each user of the information such as the scheduled time or place of the checkup specified for each user in addition to, or instead of, the dispatch schedule for the vehicle 20.

Figure 7:
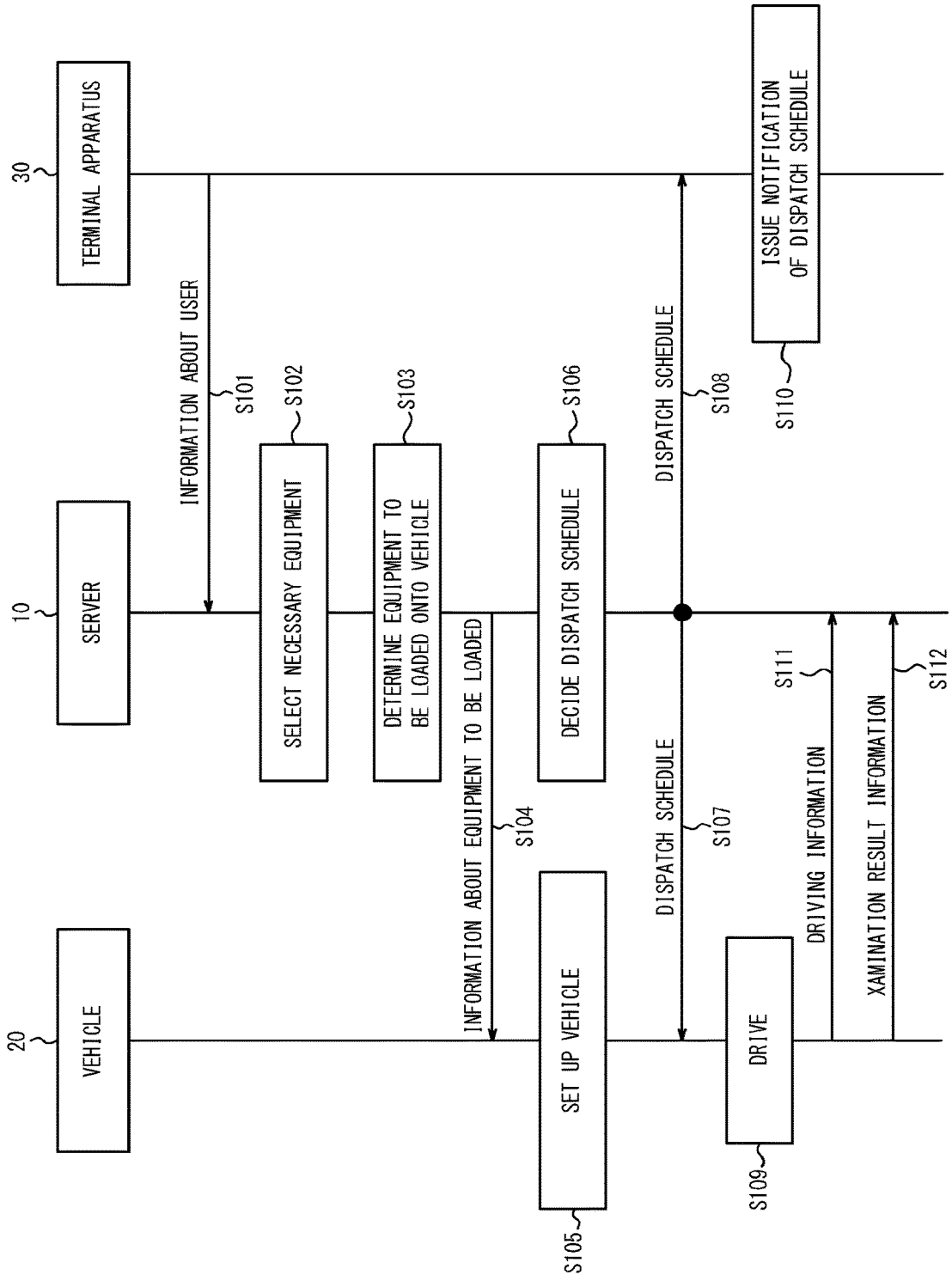
FIG. 7 is a sequence diagram illustrating an example of overall operations by a system according to an embodiment.

FIG. 7 is a sequence diagram illustrating an example of overall operations by the system 1 according to an embodiment.

Step S101: The terminal apparatus 30 transmits information about the user, to the server 10. The information about the user may include information such as the user's desired inspection items to check and desired consultation date and time for checkup for the health checkup, for example. Furthermore, the server 10 may also acquire information about the user that is necessary to the health checkup, from a source such as the database 15.

Step S102: The server 10 selects the necessary equipment to be used in the health checkup, based on the information about the user (particularly, the inspection items).

Step S103: The server 10 determines the equipment to be loaded onto the vehicle 20 (or a combination of a vehicle 20 and the equipment to be loaded onto that vehicle 20).

Step S104: The server 10 transmits information about the equipment to be loaded onto the vehicle 20 to the vehicle 20.

Step S105: The vehicle 20 loads the necessary equipment onto the vehicle 20 in accordance with the information about the equipment to load onto the vehicle 20 transmitted from the server 10, and sets up the vehicle 20.

Step S106: The server 10 decides a dispatch schedule for the vehicle 20 based on the information about the user (the user's position information and the user's desired consultation date and time for checkup).

Step S107: The server 10 transmits the decided dispatch schedule to the vehicle 20.

Step S108: Similarly, the server 10 transmits the decided dispatch schedule to the terminal apparatus 30 of the user. The server 10 may also transmit information such as the specified time or place of the checkup for each user to the terminal apparatus 30 of each user. Additionally, in addition to transmitting the dispatch schedule, the server 10 may also transmit a push notification to the terminal apparatus 30 when the vehicle 20 is driving near the user.

Step S109: The vehicle 20 starts driving based on the transmitted dispatch schedule, and a mobile health checkup facility is established in the vicinity of the user by the vehicle 20 loaded with the equipment to be used in the health checkup.

Step S110: Also, the terminal apparatus 30 displays the transmitted dispatch schedule on a screen for example to notify the user.

Step S111: While traveling, the vehicle 20 transmits driving information, which includes information such as position information and the traveling speed of the vehicle 20, to the server 10.

Step S112: The vehicle 20 may also transmit examination result information measured by the loaded equipment to the server 10. At this time, a health checkup result obtained from the examination using the equipment on the vehicle 20 may be transmitted directly to the server 10 and stored.

Moreover, stored health checkup result data may also be provided to manufacturers of supplements or medical supplies with the user's consent. The manufacturers of supplements or medical supplies can analyze the checkup result and provide samples according to the state of health of the user who has undergone a checkup.

Furthermore, various benefits may also be provided to users of the system 1. For example, a user who undergoes a health checkup in the system 1 may be given higher priority to receive a medical consultation at a specific hospital. Also, a subscription service for the use of the system 1 may be introduced, and subscribers may be registered in the server 10 and be able to undergo any number of health checkups in the system for a fixed price over a predetermined period.

According to the present disclosure, the vehicle 20 that provides a health checkup service cooperates with the government to go around a region containing many people who have not undergone a health checkup, which makes efficient health checkups possible. According to the present disclosure, health checkups may become more widespread, and healthcare costs borne by society as a whole may be reduced.

Note that the server 10 described above can be configured using a computer. In such a computer, a program stating processing content to achieve each function of the server 10 may be stored in memory of the computer, and the functions can be achieved by having a CPU of the computer read out and execute the program. Note that the program may be recorded onto a computer-readable recording medium.

The foregoing embodiment is described as a representative example, but it should be clear to persons skilled in the art that many alterations and substitutions are possible within the gist and scope of the present disclosure. Consequently, the present disclosure should not be interpreted as being limited by the foregoing embodiment, and various modifications or alterations are possible without departing from the scope of the claims. For example, it is possible to combine a plurality of function blocks described in the embodiment into a single block, or divide a single function block into a plurality of blocks.

The invention claimed is:

1. A server configured to decide a dispatch schedule of a vehicle loaded with equipment to be used in a health checkup, comprising:
a communication interface configured to acquire information about a user to undergo the health checkup; and
a controller configured to:
select the equipment to be used for the health checkup based on the information about the user,
determine equipment to be loaded onto the vehicle based on the equipment to be used for the health checkup and equipment already loaded on the vehicle, and
decide the dispatch schedule of the vehicle based on the information about the user,
wherein the vehicle is configured to perform autonomous driving or follow-up driving based upon the dispatch schedule.

2. The server according to claim 1, wherein
the information about the user is at least one of information stored in a database and information transmitted from a terminal apparatus of the user, and
the information about the user includes at least one of an inspection item for the user, position information of the user, and a desired consultation date and time for checkup specified by the user.

3. The server according to claim 2, wherein the equipment to be used in the health checkup is selected based on the inspection item for the user.

4. The server according to claim 2, wherein the dispatch schedule of the vehicle is decided based on at least one of the position information of the user and the desired consultation date and time for checkup of the user.

5. An information processing method for deciding a dispatch schedule of a vehicle loaded with equipment to be used in a health checkup, comprising:
acquiring information about a user to undergo the health checkup;
selecting the equipment to be used for the health checkup based on the information about the user;
determining equipment to be loaded onto the vehicle based on the equipment to be used for the health checkup and equipment already loaded on the vehicle; and
deciding the dispatch schedule for the vehicle based on the information about the user,.
wherein the vehicle is configured to perform autonomous driving or follow-up driving based upon the dispatch schedule.

6. The server according to claim 1, wherein the controller is configured to select the equipment to be used for the health checkup from among at least one of an electrocardiograph machine, an X-ray diagnostic imaging equipment, an ultrasonographic device, a computed tomography device, a magnetic resonance imaging device, a bed, and a chair.

7. The server according to claim 1, wherein the controller is configured to select the equipment to be used for the health checkup from among at least an electrocardiograph machine, an X-ray diagnostic imaging equipment, an ultrasonographic device, a computed tomography device, and a magnetic resonance imaging device.

8. The server according to claim 1, wherein the controller is configured to select the equipment to be used for the health checkup from among at least one a bed and a chair.

9. The server according to claim 1, wherein the controller is configured to determine the equipment to be loaded onto the vehicle based on a size of the vehicle.

10. The server according to claim 1, wherein
the vehicle includes a plurality of vehicles, and
the controller is configured to determine the equipment to be loaded among the plurality of vehicles.

11. The server according to claim 10, wherein at least two of the plurality of vehicles are a different size.

12. The server according to claim 11, wherein the controller is configured to determine the equipment to be loaded among the plurality of vehicles so as to maximize an installation density of the equipment.

13. The server according to claim 2, wherein
the user includes a plurality of users, and
the controller is configured to decide the dispatch schedule of the vehicle so as to dispatch the vehicle to a central position of the plurality of users.

14. The server according to claim 2, wherein
the user includes a plurality of users, and
the controller is configured to decide the dispatch schedule of the vehicle so that the vehicle is operated in a period of time corresponding to an average value of desired consultation dates and times of the plurality of users.

15. A system, comprising:
a vehicle;
a server configured to decide a dispatch schedule of the vehicle loaded with equipment to be used in a health checkup; and
a terminal apparatus to be used by a user, wherein
the server includes:
a communication interface configured to acquire information about the user to undergo the health checkup, and
a controller configured to:
select the equipment to be used for the health checkup based on the information about the user;
determine equipment to be loaded onto the vehicle based on the equipment to be used for the health checkup and equipment already loaded on the vehicle; and
decide the dispatch schedule of the vehicle based on the information about the user,
the terminal apparatus and the vehicle receive the dispatch schedule from the server, and
the vehicle is configured to perform autonomous driving or follow-up driving based upon the dispatch schedule.

* * * * *